United States Patent
Dachs et al.

(10) Patent No.: US 7,181,311 B2
(45) Date of Patent: Feb. 20, 2007

(54) IDENTIFICATION OF A MODULAR MACHINE COMPONENT

(75) Inventors: Oswald Dachs, Eckental (DE); Karl Rudolf Lüttich, Bad Frankenhausen (DE); Gerd Warnecke, Naumburg (DE); Andreas Melkus, Oberndorf (AT)

(73) Assignee: Demag Ergotech GmbH, Schwaig (DE)

( * ) Notice: Subject to any disclaimer, the term of this patent is extended or adjusted under 35 U.S.C. 154(b) by 0 days.

(21) Appl. No.: 11/214,233

(22) Filed: Aug. 29, 2005

(65) Prior Publication Data

US 2005/0283271 A1    Dec. 22, 2005

Related U.S. Application Data

(63) Continuation of application No. PCT/EP04/01130, filed on Feb. 7, 2004.

(30) Foreign Application Priority Data

Feb. 27, 2003   (DE) ................................ 103 08 386

(51) Int. Cl.
| B29C 45/00 | (2006.01) |
| B29C 39/00 | (2006.01) |
| B29C 30/06 | (2006.01) |
| B28B 3/06 | (2006.01) |

(52) U.S. Cl. ..................... 700/200; 700/197; 700/202; 156/125; 264/297.2; 264/297.3

(58) Field of Classification Search ................ 700/200, 700/202, 197; 156/125; 264/297.2, 297.3
See application file for complete search history.

(56) References Cited

U.S. PATENT DOCUMENTS

| 5,210,698 A | * | 5/1993 | Topmiller ................... 700/202 |
| 5,229,952 A | * | 7/1993 | Galloway et al. ........... 700/200 |
| 5,325,287 A | * | 6/1994 | Spahr et al. .................. 700/17 |
| 5,536,159 A |   | 7/1996 | Yamamura et al. |

(Continued)

FOREIGN PATENT DOCUMENTS

AT         386 983         11/1988

(Continued)

OTHER PUBLICATIONS

Wijipedia, the free encyclopedia, http://en.wikipedia/wiki/Non-volatile_storage, p. 1-3.*

(Continued)

Primary Examiner—Anthony Knight
Assistant Examiner—Sunray Chang
(74) Attorney, Agent, or Firm—Henry M. Feiereisen

(57) ABSTRACT

A plastics processing machine, in particular injection molding machine or extruder, includes at least one component represented by a clamping unit, feed and metering apparatus, plasticizing unit, injection unit, or separate injection apparatus, and characterized by specific parameters for carrying out at least one working or process step. A control device is connected to the at least one component and configured to control the at least one component, with the component-specific parameters being useable in the control device for control of the component. Provided for the component is a separate memory device in which the component-specific parameters are stored and can be transmitted to the control device prior to or upon startup of operation of the component.

15 Claims, 2 Drawing Sheets

U.S. PATENT DOCUMENTS 6,394,353 B1    5/2002    Schmitt

FOREIGN PATENT DOCUMENTS

| | | |
|---|---|---|
| DE | 37 10 605 | 10/1987 |
| DE | 44 29 304 | 6/1995 |
| DE | 197 44 443 | 10/1998 |
| DE | 297 23 770 | 2/1999 |
| DE | 100 39 093 | 3/2001 |
| DE | 199 58 790 | 6/2001 |
| EP | 0 447 233 | 9/1991 |
| EP | 1 106 557 | 6/2001 |
| WO | WO 02/04186 | 1/2002 |
| WO | WO 02/47215 | 6/2002 |

OTHER PUBLICATIONS

Kazmar D O et al.: "Polymer Injection Molding Technology For The Next Millennium: A Vision To The Future", Journal of Injection Molding Technology, Society Of Plastics Engineers, Brookfield, CT, US, vol. 1, No. 2, Jun. 1, 1997, pp. 81-90, XP000765604.

"Weniger Kabel, mehr Leistung, weniger Kosten", Plastverarbeiter, Zechner und Huethig Verlag GmbH, Speyer/Rhein, DE, vol. 47, No. 10, Oct. 1, 1996, p. 68, 70, XP000691212.

"interbus applications", release Feb./1998 by the INTERBUS Club, pp. 7-9.

"Neues revolutionierendes Messsystem mit intelligenten Steckern", Sensortechnik, Messen & Prüfen Automatisieren 1995 May, No. 6, Kaufering, DE, XP 000527077.

\* cited by examiner

IDENTIFICATION OF A MODULAR MACHINE COMPONENT

CROSS-REFERENCES TO RELATED APPLICATIONS

This application is a continuation of prior filed copending PCT International application no. PCT/EP2004/001130, filed Feb. 7, 2004, which designated the United States and on which priority is claimed under 35 U.S.C. §120 and which claims the priority of German Patent Application, Serial No. 103 08 386.3, filed Feb. 27, 2003, pursuant to 35 U.S.C. 119(a)–(d), the subject matter of which is/are incorporated herein by reference.

BACKGROUND OF THE INVENTION

The present invention relates to a plastics processing machine, in particular to an injection molding machine or an extruder, and more particularly to a plastics processing machine having at least one component being controlled by a control device.

Nothing in the following discussion of the state of the art is to be construed as an admission of prior art.

German Offenlegungsschrift DE 199 58 790 C2 discloses a machine for making parts of plastic or rubber, whereby an electronic unit, which is mounted in a plug on the machine, forms part of the control device of the machine and assumes detection of the actual temperature value with linearization and cold-spot compensation. The connection between the electronic unit and the control device is realized via a field bus.

As a consequence of an ever increasing automation, machine tools, like e.g. CNC milling machines or presses, use so-called automated tool recognition systems. Hereby it is to be understood the encoding of replacement tools by means of a chip which either contains the tool number only, whereas the CNC has stored the tool-specific parameters for this tool number, or contains per se the tool-specific parameters. Such a system is described, for example, in the "interbus applications", release 02/1998 by the INTERBUS Club. Through automated tool recognition the previously used so-called space encoding is improved and rendered flexible which involves the assignment to each tool of precisely one space where it is deposited. To provide each tool with its own chip and to provide the machine with a respective reading station is cost-effective only because of the very frequent change of tools in machine tools.

Plastics processing machines normally include a plurality of partly very complex components, among others a clamping unit, a feed and metering apparatus, a plasticizing unit or extruder. Within these components, oftentimes various configurations of elements are possible whose specific parameters must be taken into account by a control device of the machine when controlling the component. For example, a plasticizing unit or an extruder includes a screw rotating in a screw cylinder for plasticizing and thoroughly mixing the material to be processed. Depending on need, plastics processing machines may be outfitted with different configurations between screw cylinder and used screw which in turn has its own characteristics. Unlike machine tools, a configuration is involved here which oftentimes does not change oftentimes.

The crucial criteria for selection of screw and cylinder are i.a. the intended field of application and the nature of the material to be processed. The greatest transmittable torque, the greatest applicable speed, the greatest applicable injection pressure, and the greatest injection stroke depend for example on the selection of the configuration. This represents however only some of the variables that are determined by the structure of the screw, like e.g. the number and shape of the grooves and the length/diameter ratio, and by the properties of the used cylinder. Typical characteristics of a cylinder are for example the diameter, the surface finish, the number of external heating zones, i.e. the number of separately operable and heatable zones along the length extension of the cylinder, the heating or cooling capacity that can be introduced there, type and characteristics of the thermoelectric elements used as temperature sensors, to name only a few. In conformity with the screw to be used and the cylinder as well as the material to be processed, the possible areas of use of a screw cylinder combination is determined.

As all component-specific parameters must be considered when correctly operating a component by a control device of a plastics processing machine, the control programs running in the control device must be separately suited to each possible component configuration when shipped. This means for example in relation to the plasticizing unit which is used in many different screw-cylinder configurations a very complicated programming process for each delivered machine. This is also a major drawback in connection with possible changes of an existing screw-cylinder configuration, as can be encountered in the exceptional case during material change but in particular upon replacement of defective or worn screws by new ones. The continuous adjustment of the control software is also a source of errors as is any change of existing software.

Compounding this problem is the fact that this special need for customization up to now did not enable the use of a uniform control software which would be applicable for all offered components which are combined for various customers in a machine according to a modular concept, and especially for different screw-cylinder configurations. This is however of great interest in particular for certain diameter zones in relation to the screw, paired with certain second diameter zones in relation to the cylinder.

A further drawback resides in particular in connection with screw-cylinder configurations in the complicated wiring that is required when changing the used external heating zones and especially when exceeding a certain standard number in order to ensure correct temperature compensation by means of a compensating wiring. Such a temperature compensation is required when using thermoelectric elements as temperature sensors to avoid corruption of the voltage supplied by the thermoelectric elements.

It would therefore be desirable and advantageous to provide a possibility to allow application of numerous components in specific configuration, in particular plasticizing and injection units with various screw-cylinder configurations in plastics processing machines while requiring little program adjustments, and allowing use of a global control software which is as configuration-independent as possible.

SUMMARY OF THE INVENTION

According to one aspect of the present invention, a plastics processing machine, in particular injection molding machine or extruder, includes at least one component selected from the group consisting of clamping unit, feed and metering apparatus, plasticizing unit, injection unit, and separate injection apparatus, and characterized by specific parameters for carrying out at least one working or process step, a control device which is connected to the at least one component and configured to control the at least one component, with the component-specific parameters being useable in the control device for control of the component, and a separate memory device provided for the component, whereby the component-specific parameters are stored in the memory device and are transmittable to the control device prior to or upon startup of operation of the component.

In accordance with the invention, a component of a plastics processing machine and characterized by specific parameters for carrying out at least one working or process step and whose component-specific parameters are inputted in a control program as parameters which runs on a control device of the plastics processing machine when this component is operated by the control device, is provided with a separate memory unit for this component which memory device stores the component-specific parameters and from which these parameters can be transmitted to the control device before or upon startup of operation of the component. In this way, the need for separately adjusting initially the control program to the specifically used component, e.g. via hard coding of the component-specific parameters is eliminated but rather a global control software can be used which executes its operating tasks according to the transmitted component-specific parameters. Component-specific parameters relate hereby in particular to sensor and/or actuator code numbers, like for example type and nature of thermoelectric elements used as temperature sensors, diameters of cylinders, number of grooves of a screw, greatest applicable torque, maximum injection stroke, maximum temperature, etc. Dependent on these parameters are i.a. which heating capacity is to be applied by the control in which external heating zone, which torque is to be selected during startup operation, and much more.

According to another feature of the present invention, a plug connection, in particular a plug contact or a socket of such may be provided on the respective component for integration of the memory device. The advantage of using such a plug contact for accommodating the memory device is the easy accessibility, on one hand, and the possibility to provide a connection between the control device and the at least one component as well as the associated memory device. Thus, there is no need for additional attachments for the memory device.

The connection between the control device and the at least one component may be realized via a bus connection, for example by means of a field bus or sensor/actuator bus. This may be implemented via the plug contact in which the memory device for the component-specific parameter is integrated.

In addition to the transfer of the component-specific parameters to the control device of the plastics processing machine prior to or upon startup of operation of the component the bus connection advantageously serves also to transmit further signals between the at least one component and the control device. Involved hereby may be for example measuring values which are transmitted from component-mounted sensors to the control device as well as control signals which are transmitted from the control device to the component. In the case of a plasticizing unit, the measuring values may include signals from displacement pick-ups, tachometers or thermoelectric elements, the control signals are transmitted, for example, to the rotary drive, the feed apparatus or heater bands in various external heating zones.

A situation oftentimes encountered in the field of the plastics processing machines is that the sensors include thermoelectric elements for ascertaining the temperature at various locations of the component, for example along the cylinder in areas of different external heating zones. When using such thermoelectric elements, it is required to effect a temperature compensation at the transition to a cable of different material, as this takes place for example during contacting for transmission to the control device. Typically, a compensating line is hereby laid from the spot of contact to the site where the compensation takes place. As a result, when greater distances are involved between these two points, the need for cables and space is great. This represents also an additional cost factor as the compensating lines must be made of same material as the thermoelectric elements. Advantageously, the temperature compensation thus takes place directly at the transition, in the present case directly at the plug contact so that the need for extensive compensation wiring is eliminated.

In plastics processing machines, the operation of the machine depends to a high degree in particular on the parameter of the used plasticizing unit. According to the invention, the plasticizing unit of an injection molding machine or an extruder is equipped advantageously with a separate memory device which stores the component-specific parameters of the plasticizing unit. Prior to or upon startup of operation of the plasticizing unit, the component-specific parameters are transmitted to the control device. Plasticizing units generally include at least one screw and a cylinder with at least one external heating zone, although twin-screw extruders or twin-screw plasticizing units can also be used and it is generally common to provide a cylinder with several external heating zones.

According to another feature of the present invention, the memory device may be constructed as programmable non-volatile memory, in particular as EEPROM (Electrically Erasable and Programmable Read-Only Memory) to allow changes in the configuration also later, for example to provide an additional external heating zone, and to store these changes of the component-specific parameters in the memory device, without requiring an exchange of the memory device.

According to another feature of the present invention, the memory device may be part of a decentralized control module which is part of the control device of the plastics processing machine and which is mounted to the at least one component. Also this decentralized control module may be integrated directly in the plug contact so as to be able to ensure a good connection to the control device via the field bus connection. In this way, it is possible to process component-specific control processes directly on the component, in particular on the plug contact via which the connection is established to the remaining control device, and to thereby minimize the wiring complexity.

According to another feature of the present invention, a voltage supply may be provided at the plug contact, which is prerequisite for the operation in particular of a decentralized control module.

Provision of separate memory devices which store component-specific parameters is not limited to the plasticizing unit, rather any other component necessary for operation of a plastics processing machine may include its own memory device for transmitting the component-specific parameters prior to or upon startup of operation of the component to the control device. Examples include the clamping unit or also the feed apparatus or metering apparatus for material to be plasticized, but also injection devices separate from the plasticizing unit may be outfitted accordingly.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
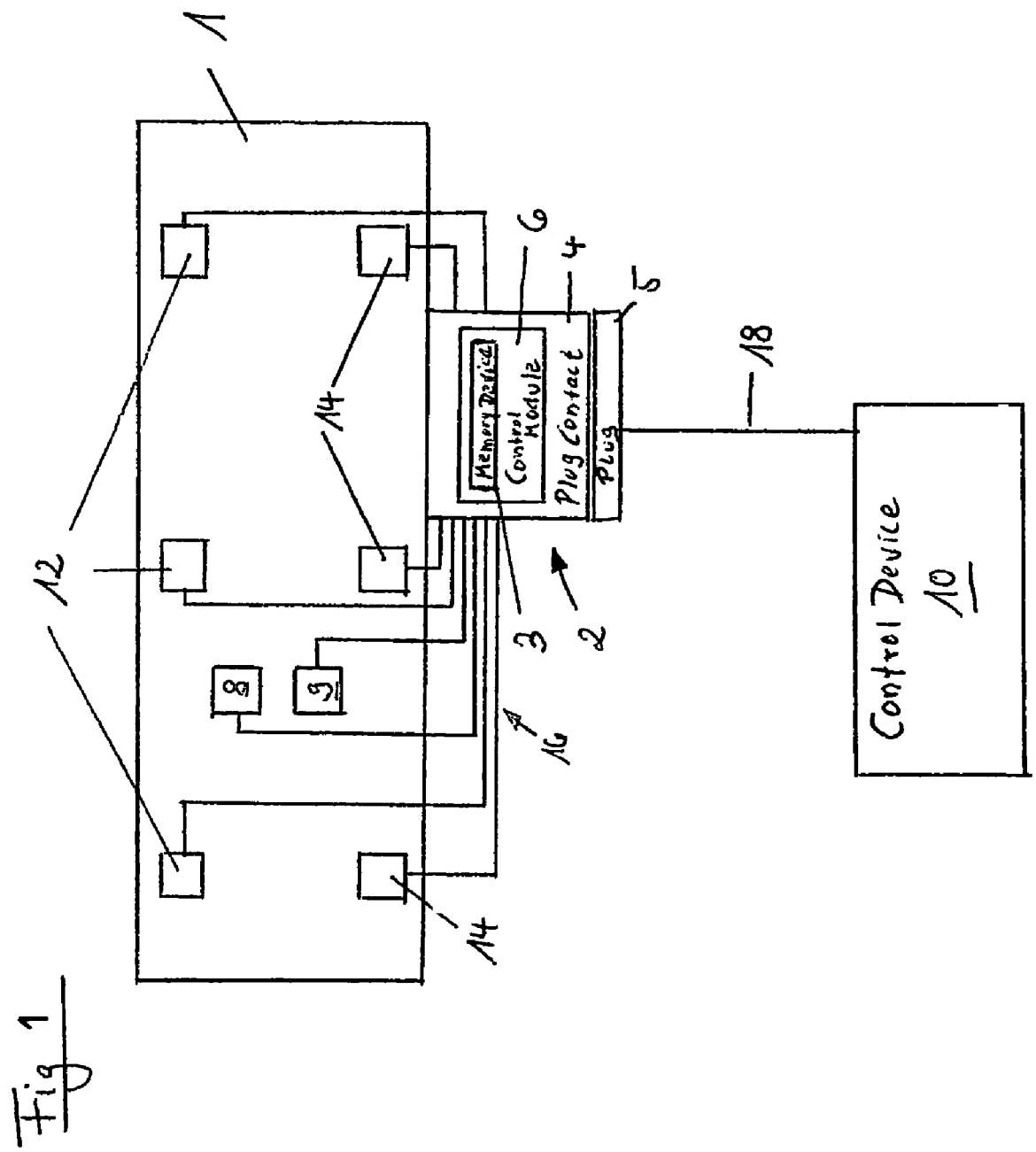
FIG. 1 shows schematically a block diagram of a plastics processing machine having incorporated the subject matter of the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

An unillustrated injection molding machine includes a control device 10 configured as stored-program controller (SPC) and a plasticizing unit 1 shown only schematically and having a plasticizing screw and a plasticizing cylinder on which a plug connection 2 with a plug contact 4 and a plug 5 is provided. The plasticizing unit 1 includes various sensors 8 and actuators 9 of which only one is respectively shown here by way of example. The sensors may involve also separately depicted thermoelectric elements 12 whereas heater bands 14 belong to the actuators. Sensor and actuators are connected via connecting lines 16 with the plug contact 4. Connected to the plug contact 4 via the plug 5 is a field bus 18 which may involve for example a DIAS bus. During operation of the plasticizing unit 1, measuring values of sensors 8, mounted to or in the plasticizing unit 1 and involving thermoelectric elements 12 for example, are transmitted via this bus 18 to the SPC 10 as are control signals outputted by the SPC 10, on the other hand, to the actuators 9, 14 of the plasticizing unit 1.

Integrated in the plug contact 4 is a decentralized control module 6, as known from distributed controllers. The control module 6 contains in addition a memory device 3 which is shown only schematically and configured in the form of an EEPROM, to store specific parameters that characterize the plasticizing unit 1 and can be transmitted to the SPC 10 or its decentralized control module 6 prior to or upon startup of operation of the plasticizing unit 1. Examples of these component-specific parameters in the case of the plasticizing unit 1 of an injection molding machine include the cylinder diameter as well as the screw diameter, the maximum attainable injection pressure, the maximum path that can be traveled by the screw, the maximum applicable torque as well as the maximum attainable rotation speed, the number of grooves of the screw and optionally also of the cylinder, the length-diameter ratio of the screw, the maximum permissible temperature, the number of external heating zones present on the cylinder, the attainable heating and cooling capacities per zone as well as information about the heater bands. Additional information can be stored about which type of closure the cylinder is operated with, i.e. whether an open cylinder or the like is involved which is closeable by a rotary pin. Also any other component-specific parameters may be stored in the EEPROM.

The decentralized control module 6 integrated in the plug contact 4 and including the memory device has a voltage supply and its own electronics. Temperature compensation for operating thermoelectric elements 12 mounted in the individual external heating zones for checking the actual temperature is realized directly by the electronics provided in the plug contact 4 so that additional compensating lines can be eliminated and the number of used thermoelectric elements 12 is not limited.

The use of the decentralized control module 6 with integrated memory device on the plasticizing unit 1 allows the construction of an injection molding machine with most different screw-cylinder configurations, without requiring to respectively suit the control programs running in the SPC 10 to the new specific parameters as those are already present in the plug contact 4, provided on the plasticizing unit 1 and including the integrated memory device 3, and are read in from there by the SPC 10 before operating the plasticizing unit and thus can be correctly considered by the control programs running in the SPC 10.

In this way, it is also possible to use uniform software for the SPC 10 for any cylinder-screw configurations since the control programs executed by the SPC receive the component-specific parameters represented in the algorithms only before or upon startup of operation of the plasticizing unit 1. The term "startup of operation" relates hereby to any powering up of the machine and not only during initial installation. As a result, logistics and assembly as well as documentation and customer service can be reduced as it becomes unnecessary to conform to each configuration that is used, but a standard control program is used that covers all possible configurations or at least several configuration options. Moreover, the use of a standardized plug contact simplifies the attachment of the plasticizing unit 1 to the control unit 10; less errors can thus occur during assembly.

Exchange of a plasticizing unit 1 in an injection molding machine can be implemented by the solution according to the invention in form of a "plug & play" version, as known of add-on devices to the PC, since except for the exchange of the plasticizing unit 1 or the components of the plasticizing unit and the provision of the respective plug contact 4 whose memory device stores the new specific component parameters, no further modifications are necessary on the machine and its SPC 10.

As a consequence of using a non-volatile programmable control unit, for example an EEPROM, it is also possible to keep the plug contact 4 unchanged when carrying out small modification in the structure of the plasticizing unit 1 and to execute only a re-programming of the respective parameters in the memory device 3, which is easy to implement.

The use of plastics processing machine according to the invention results in a new flexibility during operation and the screw-cylinder configuration can easily be modified.

Figure 2:
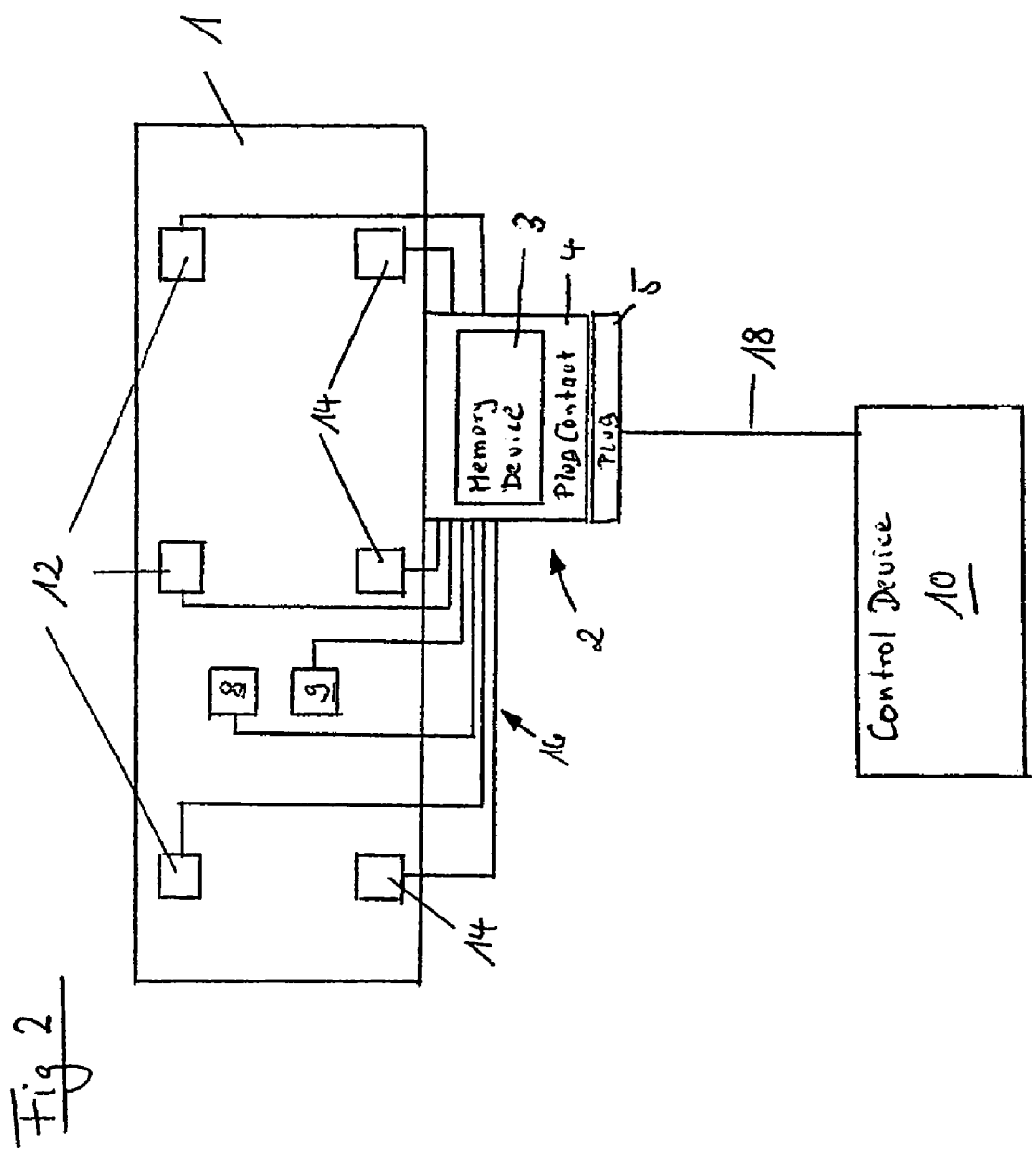
FIG. 2 shows schematically a block diagram of a variation of a plastics processing machine having incorporated the subject matter of the present invention.

FIG. 2 shows schematically a block diagram of a variation of a plastics processing machine having incorporated the subject matter of the present invention. Parts corresponding with those in FIG. 1 are denoted by identical reference numerals and not explained again. The description below will center on the differences between the embodiments. In this embodiment, the plug contact 4 of the plug connection 2 contains the memory device 3 in the absence of a control module.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A plastics processing machine, in particular injection molding machine or extruder, comprising:
    at least one component of the plastics processing machine characterized by component-specific parameters for carrying out at least one working or process step;
    a control device providing control signals to or receiving measurement signals from the at least one component and configured to control the at least one component, with the component-specific parameters being useable in the control device for control of the component; and
    a separate memory device associated with the at least one component and storing the component-specific parameters, said memory device being removably connected to the control device for transmitting to the control device the specific parameters prior to or upon startup of operation of the component.

2. The plastics processing machine of claim 1, wherein the at least one component has a plug connection for allowing connection of the at least one component to the control device, said memory device being integrated in the plug connection.

3. The plastics processing machine of claim 2, wherein the plug connection includes a plug contact and a plug, with the plug contact accommodating the memory device.

4. The plastics processing machine of claim 1, further comprising a bus connection for connecting the control device to the at least one component.

5. The plastics processing machine of claim 4, wherein the bus connection for the transfer of the component-specific parameters and the transfer of further signals is provided between the at least one component and the control device.

6. The plastics processing machine of claim 1, wherein the at least one component comprises at last one of a sensor and an actuator, said control signals including measurement values transmitted from the sensor to the control device and control signals transmitted from the control device to the actuator.

7. The plastics processing machine of claim 6, wherein the sensor is a thermoelectric element.

8. The plastics processing machine of claim 7, wherein the component-specific parameters comprise a temperature compensation for the thermoelectric element directly at the plug contact.

9. The plastics processing machine of claim 1, wherein the plasticizing unit as the at least one component includes at least one screw and one cylinder with at least one external heating zone.

10. The plastics processing machine of claim 1, wherein the separate memory device is a non-volatile programmable memory.

11. The plastics processing machine of claim 4, wherein the at least one component comprises a decentralized control module and wherein the separate memory device is integrated in the decentralized control module.

12. The plastics processing machine of claim 11, wherein the component has a plug connection for allowing connection of the component to the control device, said plug connection including a plug contact and a plug, said decentralized control module being integrated in the plug contact.

13. The plastics processing machine of claim 11, wherein the decentralized control module comprises a power supply.

14. The plastics processing machine of claim 1, further comprising a plurality of said separate memory devices to store the component-specific parameters of a plurality of components, wherein the component-specific parameters are transmittable to the control device prior to or upon startup of operation of the components.

15. The plastics processing machine of claim 1, wherein the at least one component is selected from the group consisting of clamping unit, feed and metering apparatus, plasticizing unit, injection unit, and separate injection apparatus.

* * * * *